United States Patent [19]

Enokida

[11] Patent Number: 5,646,685
[45] Date of Patent: Jul. 8, 1997

[54] MOVING IMAGE PROCESSING METHOD AND APPARATUS

[75] Inventor: Miyuki Enokida, Yokohama, Japan

[73] Assignee: Canon Kabushiki Kaisha, Tokyo, Japan

[21] Appl. No.: 589,474

[22] Filed: Jan. 22, 1996

Related U.S. Application Data

[62] Division of Ser. No. 448,192, May 23, 1995, Pat. No. 5,489,941, which is a division of Ser. No. 277,106, Jul. 20, 1994, Pat. No. 5,428,393, which is a division of Ser. No. 885,870, May 20, 1992, Pat. No. 5,359,365.

[30] Foreign Application Priority Data

May 24, 1991 [JP] Japan .................................. 3-119760
May 24, 1991 [JP] Japan .................................. 3-119761

[51] Int. Cl.⁶ .................................................. H04N 7/50
[52] U.S. Cl. ............................ 348/390; 348/402; 360/15
[58] Field of Search ................................ 348/390, 402, 348/714, 715, 716; 360/15; H04N 7/50

[56] References Cited

U.S. PATENT DOCUMENTS 4,410,917  10/1983  Newdoll .................................. 360/15
4,735,349  4/1988   Keith ....................................... 348/390
4,785,349  11/1988  Keith et al. ............................. 348/390

Primary Examiner—Howard W. Britton
Attorney, Agent, or Firm—Fitzpatrick, Cella, Harper & Scinto

[57] ABSTRACT

A moving image processing method and apparatus for efficient access to a large amount of moving image data. By the hierarchical structure of storage media for storing the compressed moving image data, when reproduction of compressed moving image data is displayed, the data can be transferred with an adjustment of the transfer speed to a predetermined display speed of the moving image. More specifically, the compressed moving image data is transferred from a first storage medium having a large capacity and a slow access speed to a second storage medium having a small capacity and a fast access speed and further transferred from the second storage medium to an expander which expands the data and displays the expanded data. The compressed moving image data and the corresponding administrative information are stored separately in different storage media which are accessible independently of each other. However, the moving image data and the administrative information are regarded as one logical file, preventing an access conflict of the moving image data and the administrative information. Thus efficient access and reproduction of moving image data can be performed.

1 Claim, 12 Drawing Sheets

| MOVING IMAGE FILE NAME | DISK NO. | FILE NAME IN HD | FRAME NO. |
|---|---|---|---|
| A | 0 | temp - A | 0 |
| B | 1 | temp - B | 0 |
| C | 0 | temp - C | 0 |
| C | 1 | temp - C1 | 60 |
| | | | |

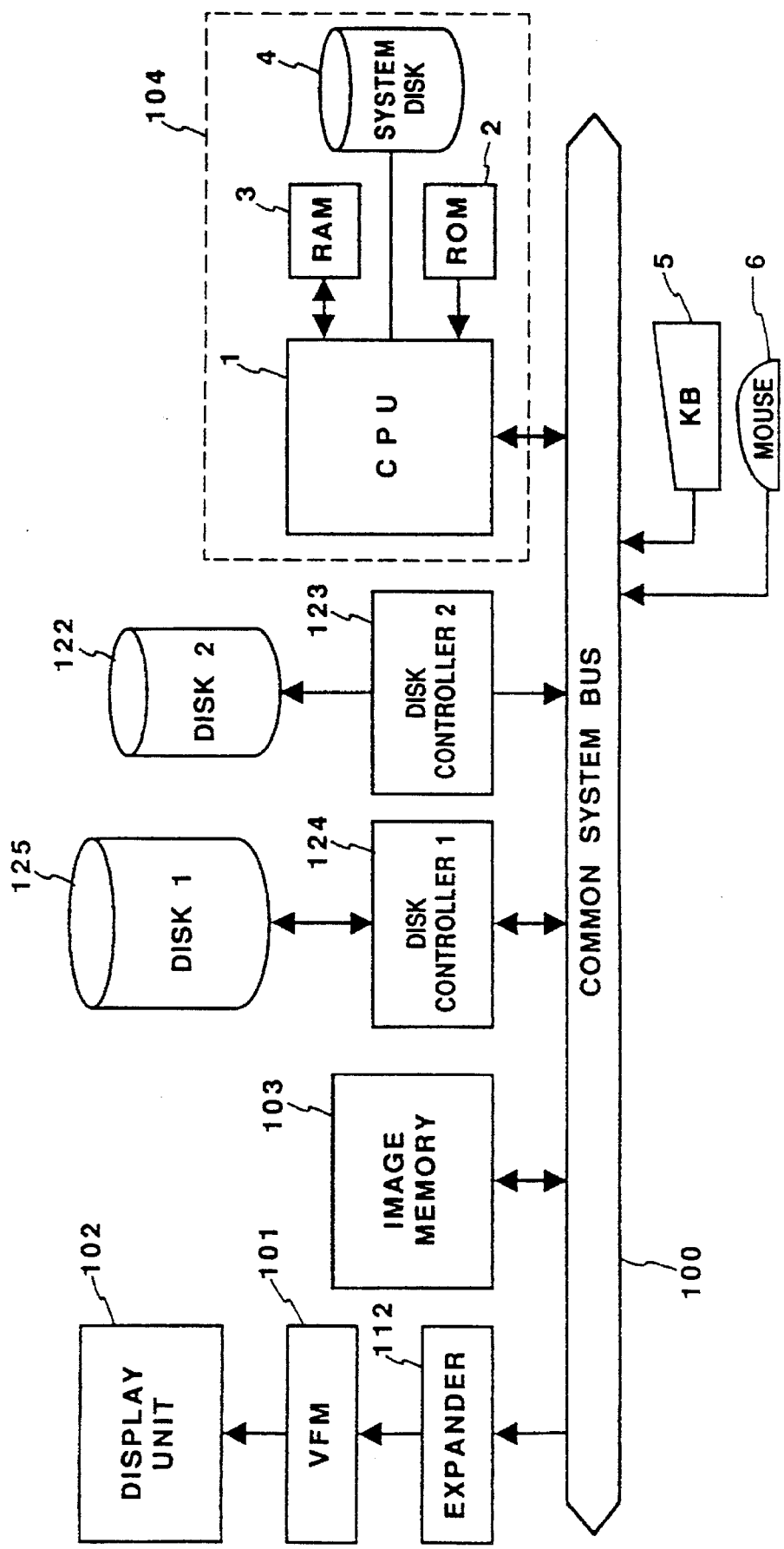
F I G. 8

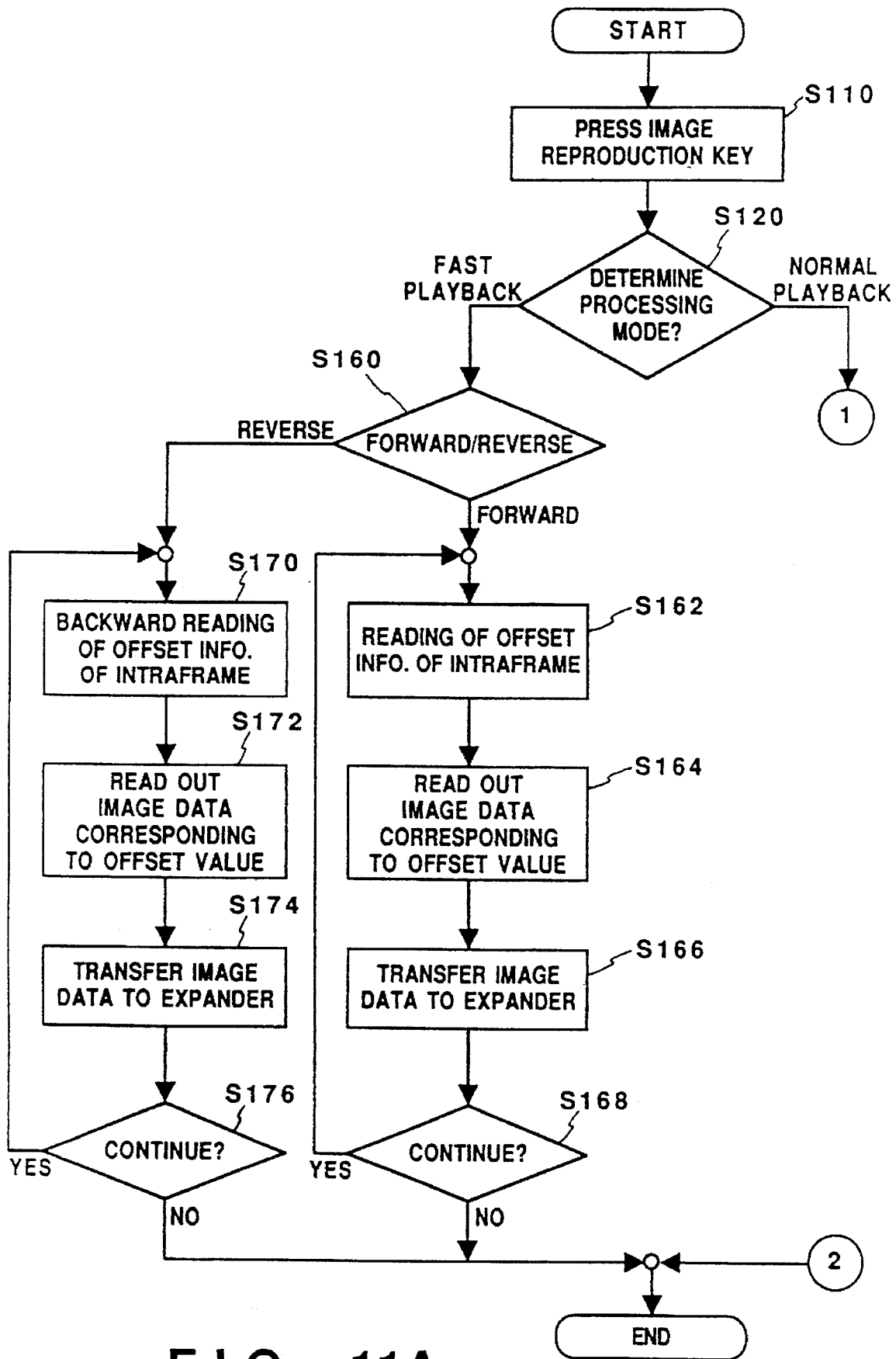
F I G. 11A

MOVING IMAGE PROCESSING METHOD AND APPARATUS

This application is a division of application Ser. No. 08/448,192 filed May 23, 1995 (now U.S. Pat. No. 5,489, 941), which is a division of application Ser. No. 08/277,106, filed Jul. 20, 1994, now U.S. Pat. No. 5,428,393, which is a division of application Ser. No. 07/885,870, filed May 20, 1992, now U.S. Pat. No. 5,359,365.

BACKGROUND OF THE INVENTION

1. Field of the Invention

The present invention relates to a moving image processing method and apparatus and, more particularly, to a moving image processing method and apparatus capable of efficient transfer of moving image data without data access conflict.

2. Description of the Prior Art

In conventional moving image processing apparatuses, various methods for storing moving image data have been proposed:

(1) A storing method in which only the moving image data is stored without additional information such as scene-change;

(2) A method in which moving image administrative information, such as the resolution or the total frame number of moving image data, is added as a header or added to the end of the data;

(3) A method in which moving image data and the moving image administrative information of the data are separately stored in the form of files in a common storage medium such as a hard disk;

(4) A method for storing the moving image data by frame when the compression of a moving image data is not performed. Each of the frames is stored as one file; and (5) A method based on Moving Image Coding Scheme being standardized by the MPEG (Moving Picture Coding Experts Group), a working group of the ISO (International Organization for Standardization). In this method, VLC (variable length code) Huffman coding is employed for the compression of a moving image data. The basic algorithm of this method is motion compensation+DCT (Discrete Cosine Transform).

This method is for storing moving image data having different lengths of frames.

In the above methods, when stored moving image data has no additional information, it is impossible to provide any operation other than (forward or reverse playback). In a case where a common storage medium such as a hard disk stores moving image administrative information as well as moving image data, if a moving image data is designated to be displayed while another moving image data is being displayed, or if moving image administrative information is designated to be read out in mid-course of displaying moving image data, there is the possibility of an access conflict, as a result of which the display speed of the currently displayed image data cannot be kept at 30 frames/second. In a case where a user manages moving image data as one file and moving image administrative information as another in a common storage medium, a conceivable drawback is that the correspondence between a moving image and its administrative information can not be established. In this case, the moving image data and the moving image administrative information being inconsistent may be deleted inadvertently, disturbing the relation of other moving image data and corresponding administrative information.

When data compression is performed on the basis of a method proposed by MPEG, if a moving image data has no moving image administrative information, there is no access to an object frame of the data from which the data is to be replayed without searching from the start to the end of the data. The problem is that the above retrieval is inefficient.

In comparison with a still image processing apparatus, a moving image processing apparatus processes 20 much more data. For this reason, a conventional moving image processing apparatus requires a hard disk with a large capacity for accumulating a huge amount of moving image data and a high-speed disk interface for displaying image data at a speed of about 30 frames/sec. If the input-output speed of the hard disk is not up to a predetermined standard, the apparatus further requires an image memory for temporary storage or a semiconductor disk equipped as an input-output unit.

However, in the aforementioned apparatus, the input-output speed of the disk interface is too slow to keep the 30 frames/sec speed for reading out image data. Accordingly, in order to maintain the above speed, the size of the image is reduced or data compression is performed, causing the problem that moving image data of high quality cannot be reproduced. Another drawback is that an apparatus equipped with a large-capacity hard disk and a high-speed disk interface costs a great deal, while an apparatus having a small-capacity hard disk can not store a large amount of moving image data, nor a moving image of high quality.

The structure of the apparatus including an image memory for temporary storage or a semi-conductor disk realizes desired high-speed read-out, but the data storage capacity is limited due to the memory capacity or the capacity of the semi-conductor disk, and besides, all these devices are expensive.

The conventional apparatus can store a plurality of original moving image data by adopting storage media such as removable OMD's (optical-magnetic disk). Such additional storage media might be employed in storing the enormous amount of data. In this case, however, no advancement in the point of image quality can be expected, considering that the input-output speed and the access speed of the disk interface thereof is slow.

SUMMARY OF THE INVENTION

Accordingly, it is an object of the present invention to provide a moving image processing method capable of providing efficient access to a moving image data.

According to the present invention, the foregoing object is attained by providing a moving image processing method of expanding a compressed moving image data and displaying the expanded data, which comprises a first transfer step for transferring the compressed moving image data stored in a first storage medium having a large capacity and a relatively slow access speed to a second storage medium having a small capacity and a fast access speed, second transfer step for reading the compressed moving image data out of the second storage medium and transferring the compressed moving image data to an image expanding unit while adjusting the transfer speed to a predetermined display speed of the moving image, and a display step, for displaying the moving image data expanded by said image expansion unit.

It is another object of the present invention to provide a moving image processing apparatus capable of providing efficient access to moving image data.

According to the present invention, the foregoing object is attained by providing a moving image processing apparatus for expanding a compressed moving image data and displaying the expanded data, which comprises first storage means for storing the compressed moving image data, second storage means for storing the compressed moving image data stored in the first storage means, expansion means for expanding the compressed moving image data stored in the second storage means while adjusting the expansion speed to a predetermined display speed of the moving image and means for supplying the expanded moving image data output from the expansion means to a display monitor.

In accordance with the present invention as described above, the compressed moving image data stored in the first storage means is read out and output into the second storage medium. The compressed moving image data is read out of the second storage medium and transferred to the expansion means in accordance with a predetermined display speed of the moving image. The expansion means expands the compressed moving image data and outputs the expanded data to the display means.

The present invention is particularly advantageous since the compressed moving image data initially stored in the first storage medium whose access speed is comparatively slow is read out to the second storage medium whose access speed is fast is thereafter expanded to be displayed. This hierarchical structure of the moving image storage unit realizes an appropriate selection of a storage medium based on the kind of data to be stored. Consequently, a moving image apparatus can be flexibly arranged in view of cost performance.

It is another object of the present invention to provide a moving image processing apparatus capable of providing efficient access of moving image data.

According to the present invention, the foregoing object is attained by providing a moving image processing method for expanding a compressed moving image data and displaying the expanded data which comprises an instruction step for instructing a reproduction mode of moving image data a retrieval step for retrieving administrative information of the compressed moving image data, which is stored in a first storage medium in accordance with the reproduction mode, a read-out step for reading the compressed moving image data out of a second storage medium which is accessible separately from said first storage medium, in accordance with said administrative information retrieved in the retrieval step, and an expansion and display step for expanding the compressed moving image data read out in the read-out step and displaying the expanded data.

It is another object of the present invention to provide a moving image processing method capable of providing efficient access of moving image data.

According to the present invention, the foregoing object is attained by providing a moving image processing apparatus for expanding compressed moving image data and displaying the expanded data using a display means, which comprises a first storage medium for storing the compressed moving image data, a second storage medium for storing administrative information of the compressed moving image data and expansion means for expanding the compressed moving image data and supplying the expanded data to the display means, wherein the first storage medium and the second storage medium are independent of each other and are respectively accessible.

In accordance with the present invention as described above, the compressed moving image data and the administrative information are separately stored in plural storage media and are accessed separately.

The invention is particularly advantageous since the compressed moving image data and the administrative information are separately stored in plural storage media to be accessed separately. This configuration enables efficient access of moving image data, while preventing access conflict. Further, the apparatus which comprises the separate storage media for kinds of information characteristics enables an appropriate selection of a storage medium based on the characteristics of the information. Consequently, an optimally configured and cost worthy moving image processing apparatus can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a block diagram showing the configuration of the moving image processing apparatus according to a fourth embodiment;

FIGS. 11A and 11B are a flowchart showing moving image reproducing processing.

DETAILED DESCRIPTION OF THE PREFERRED EMBODIMENTS

The preferred embodiments of the present invention will be described in detail in accordance with the accompanying drawings.

[Common Moving Image Compression (FIGS. 1 and 2)]

In the five embodiments of the present invention described below the Moving Picture Coding Scheme for DSM (digital storage media) being standardized by the MPEG ISO (hereinafter, referred to as MPEG scheme) is employed as a moving image compression method. As described above, the basic algorithm of this method is DCT (Discrete Cosine Transform)+motion compensation.

In a system according to the NTSC, the resolution of an object moving image is 352×240×30 frames/sec, the data coded rate is within 900 Kbps~1.15 Mbps.

Figure 1:
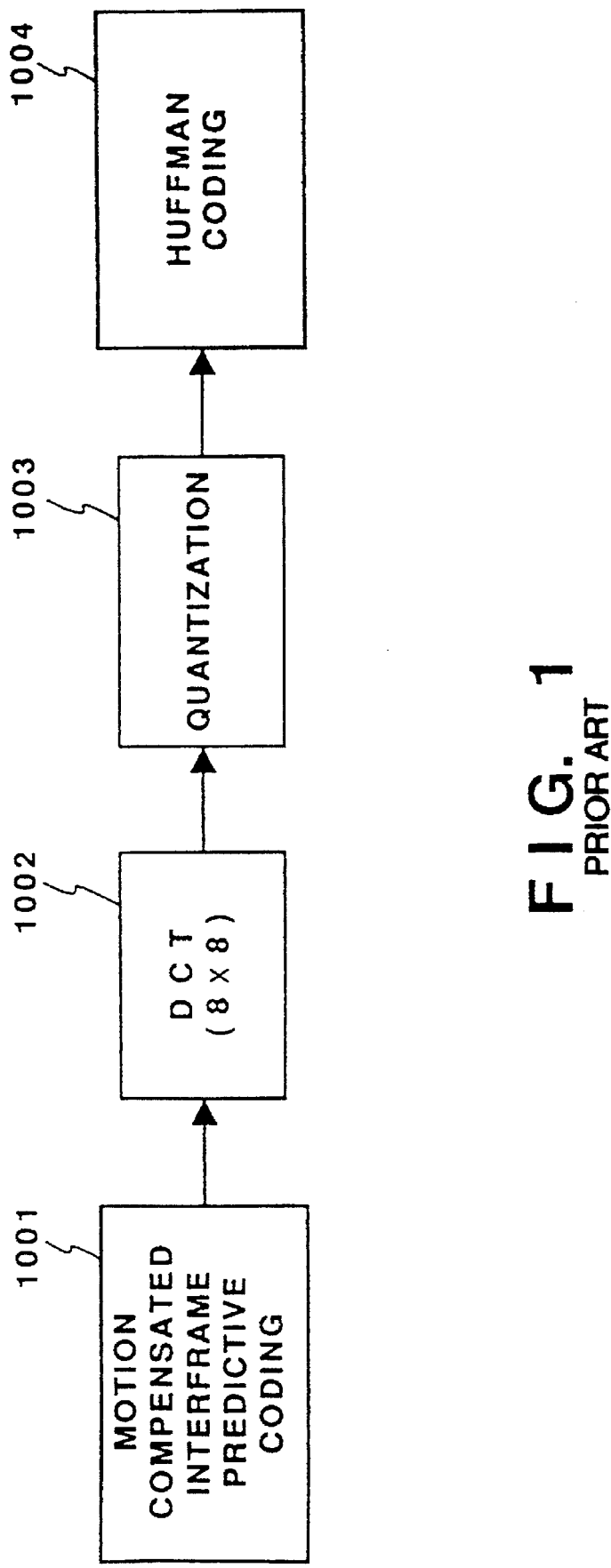
FIG. 1 is a block diagram explaining the outline of a moving image coding procedure.
Figure 2:
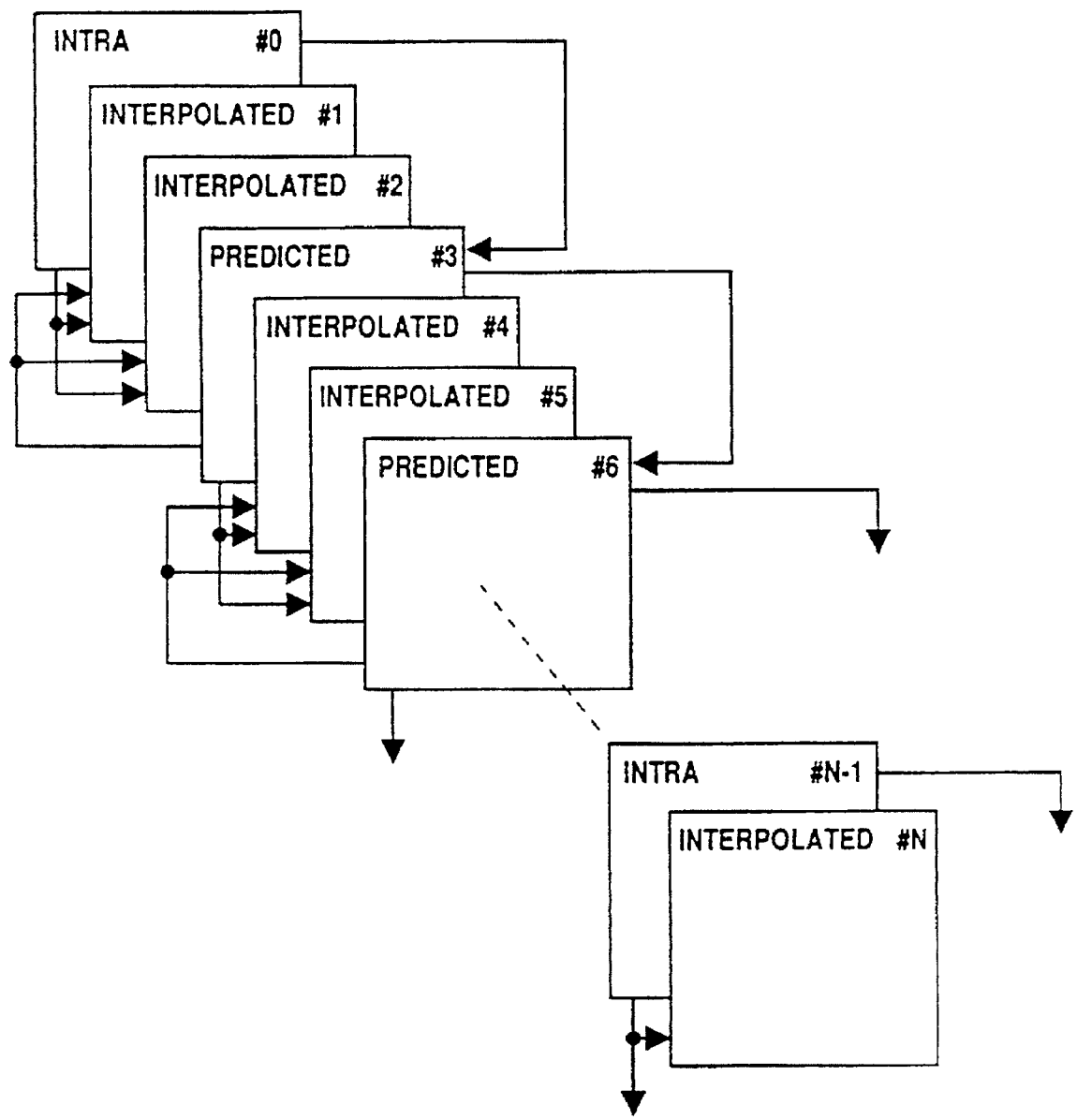
FIG. 2 is a block diagram showing the construction of coded moving image data.

FIG. 1 shows the outline of a moving image coding procedure based on the MPEG scheme. FIG. 2 simply illustrates interframe prediction among the data frames. As shown in FIG. 1, MPEG scheme, called variable length coding, consists of motion compensated interframe predictive coding (1001) and DCT (1002), which are basic algorithms, quantization (1003) and the allocation of Huffman code (1004).

In FIG. 2, the interframe predictive coding 1001 includes predictive-coding (Predicted #n (n=3, 6) and bidirectionally predictive-coding (Interpolated #n (n=1, 2, 3, 4, 5 and N)). Intra-coding (Intra #n (n=0, N−1)) is carried out for image compression in a data frame. The intra-coding is periodically performed for the improvement of image quality. The period is defined as N. In the embodiments of the present invention, the period N is set to 15.

As will be described below, a frame to which the intra-coding is applied is referred to as an intraframe; a frame to which the predictive-coding is applied, a predicted frame; and a frame to which the bidirectionally predictive-coding is applied, an interpolated frame.

[First Embodiment (FIGS. 3 and 4)]

Figure 3:
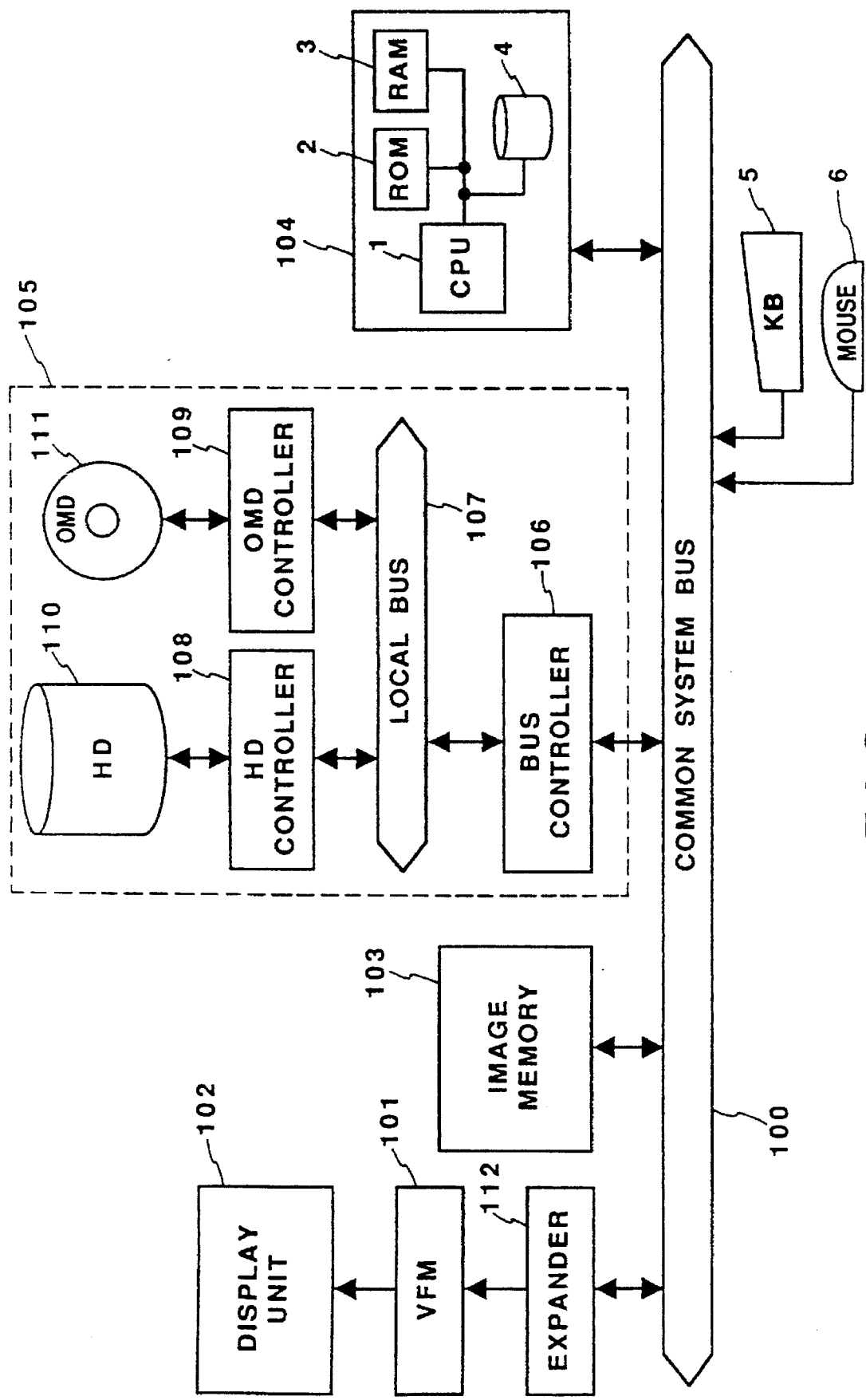
FIG. 3 is a block diagram showing the configuration of a moving image processing apparatus according to a first embodiment of the present invention.

FIG. 3 is a block diagram showing the configuration of the moving image processing apparatus according to the first embodiment. In FIG. 3, a common system bus 100 combines components in the apparatus. A video frame memory unit (VFM) 101 includes a video frame memory which stores a moving image to be displayed and a D/A converter which generates an input signal to a display unit 102. A CPU unit 104 controls the overall apparatus. An image memory 103 stores image data to be processed by a CPU 1. A moving image storage unit 105 stores an moving image data. An expander 112 expands an moving image data compressed in accordance with MPEG scheme which will be described later. A keyboard (KB) and a mouse 6 are for manual operations.

In the CPU unit 104, the CPU 1 has a ROM 2 for storing a controlling program, a RAM 3 employed as a working area and a system disk 4 used for backup of the controlling program or the like. The moving image storage unit 105 comprises a removable OMD 111, an OMD controller 109 for controlling the removable OMD 111, a hard disk (HD) 110 capable of high-speed access and high-speed data transfer, a high-speed disk controller (HD controller) 108 for controlling the HD 110, a local bus 107 and a bus controller 106 for connecting the local bus 107 with the common system bus 100.

In this embodiment, it is premised that the resolution of high precision moving image data based on HDTV specification or the like is 1920 pixels ×1035 lines×30 frames/sec, the data transfer rate of OMD controller 109 is 2.4M bytes/sec based on the SCSI (Small Computer System Interface) standard, and that of the HD controller 108 is 10M byte/sec based on the IPI (Intelligent Peripheral Interface) standard. In comparison with the NTSC method, the amount of image data for one second in an HDTV system is about 24 times larger. Assuming that the compression rate of this image data is unchanged after compression in the MPEG scheme, coded data of this image data will also be 24 times larger, and therefore it is impossible to directly read out the coded data keeping the normal 30 frames/sec display speed from the OMD 111, where and moving image data is stored, through the OMD controller 109 based on the SCSI standard.

In consideration of the above condition, the present embodiment is arranged for high-speed read-out of moving image data, where moving image data is transferred to the HD controller 108 from the OMD 109. Here the HD controller 108 is used as a kind of buffer or a cache.

Figure 4:
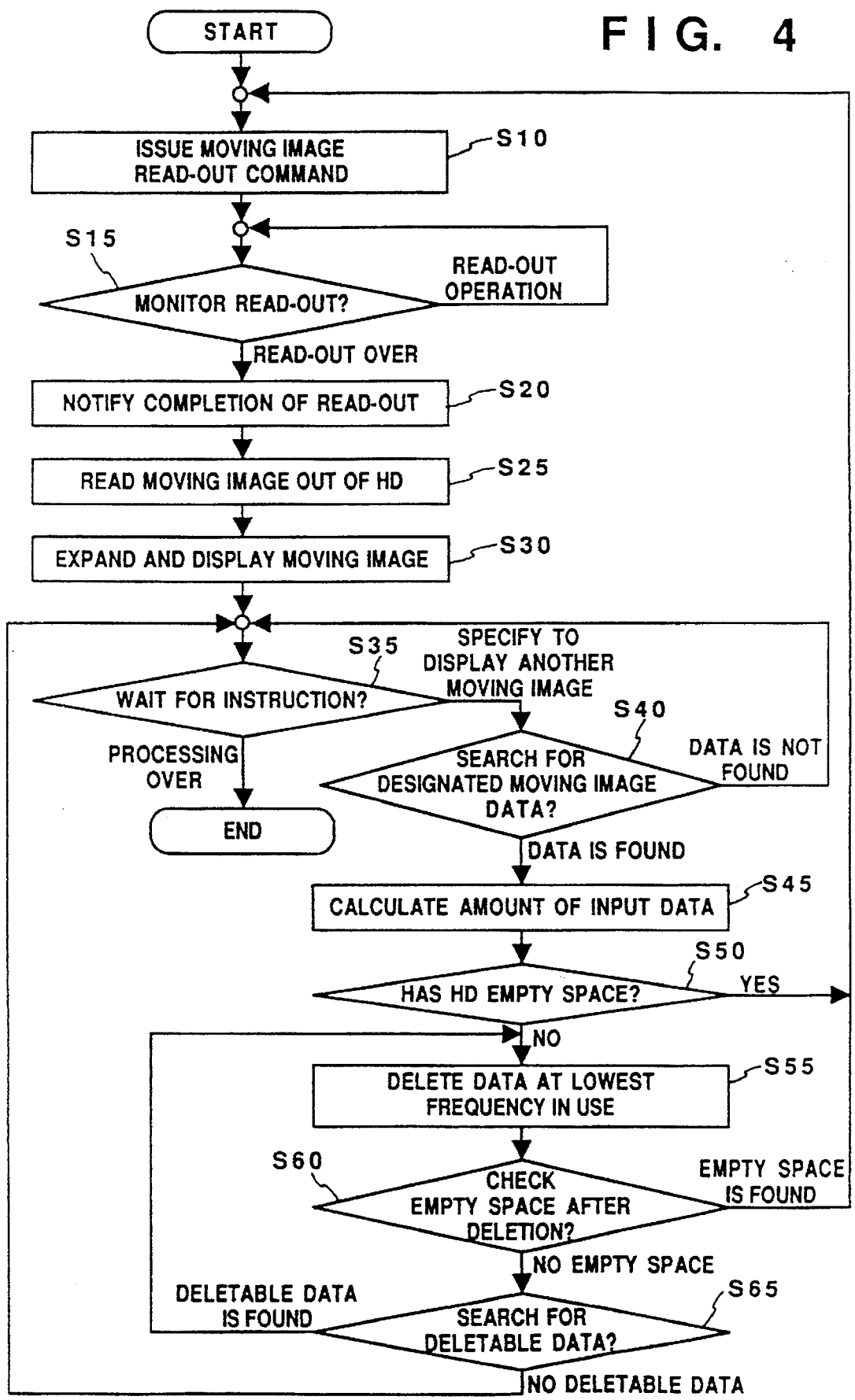
FIG. 4 is a flowchart showing read-out processing of moving image data.

The reading-out of moving image data by the moving image processing apparatus having the above configuration will be described with reference to the flowchart of FIG. 4. In this case, high precision moving image data based on the HDTV standard is stored in the OMD 111, and a user designates read-out of the moving image data from the OMD 111 by using the keyboard 5 or the mouse 6.

At step S10, the CPU 1 issues a read-out command for reading out the moving image data to the OMD controller 109 through the bus controller 106, and at the same time, instructs the HD controller 108 to write the moving image data read out of the OMD 111 into the HD 110 via the local bus 107. Further, the CPU 1 instructs the bus controller 106 to logically disconnect the local bus 107 from the system bus 100.

At step S15, the bus controller 106 monitors the read-out of the moving image data by the OMD controller 109 and the writing of the data by the HD controller 108 till these input-output operations are completed. The bus controller 106 notifies the CPU 1 of the completion of the input-output of the moving image data by issuing an interrupt signal at step S20. Until the CPU 1 receives the interrupt signal, the CPU 1 is capable of concurrently performing operations such as controlling the image memory 103 through the common system bus 100 and controlling the VFM 101, for the aforementioned input-output of the moving image data is carried out through the local bus 107 without any load on the common system bus 100.

When the transfer of the moving image data from the OMD 111 to the HD 110 is completed, the CPU 1 issues an instruction the HD controller 108 through the bus controller 106 to read the moving image data out of the HD 110, and at the same time, issues an instruction to the bus controller 106 to logically reconnect the local bus 107 with the common bus 100 to write the moving image data read out of the HD 110 into the expander 112 through the common system-bus 100 at step S25. The CPU 1 further issues an instruction for the expander 112 in order to expand the input moving image data and to write the expanded data into an address in the VFM 101, which corresponds to a position on the display that the user has designated.

At step S30, in response to the instruction from the CPU 1, the expander 112 expands the moving image data read out of the HD 110 and outputs the expanded data to the VFM 101. Thus moving image data is displayed in the display unit 102.

At step S35, the processing is in waiting status till the next instruction arrives. If the user specifies the completion of the processing, the processing is over at this time. If the user specifies another moving image to be displayed, the processing proceeds to step S40, where input operation of the moving image data from the OMD 111 is started after the completion of output of the moving image data from the HD 110.

At step S40, whether the moving image data designated by the user is in the OMD 111 is examined. If the moving image data is not found in the OMD 111, the processing returns to step S35, waiting for the user's further instruction. If the moving image data is found in the OMD 111, the processing proceeds to step S45, where input data amount is calculated. The processing proceeds to step S50, at which it is examined whether the HD 110 has enough empty space to store the moving image data. When the HD has enough space, the processing returns to step S10, where the moving image data is read out of the OMD 111 and is written into the HD 110. When the HD is full, the processing proceeds to step S55. A search for a moving image data whose frequency in use is the lowest among data stored in the HD 110 is performed and the moving image data at the lowest frequency in use is deleted. At step S60, it is examined whether the storage space made by the above deletion of data is enough for the designated moving image data. If it is determined that the HD 110 has enough space, the processing returns to step S10 for starting input of the moving image data, but if not, the processing proceeds to step S65. A further search for a moving image data among the data in the HD 110 which can be deleted is performed. If there is no data to be deleted, it is determined that the input of the moving image data is impossible, and the processing returns to step S35 where the user's next instruction is awaited. If there is data to be deleted, the processing returns to step S55 where deletion of the data is executed.

According to the first embodiment thus the HD 110 behaves like a cache memory, which enables high-speed display of moving image data in frequent use, because retransfer of those data from the OMD 111 can be omitted. Further, the HD 110 is available as a working area of the image memory 103 at the time of processing of moving image data.

[Second Embodiment (FIG. 5)]

In the first embodiment, data transfer from the OMD 111 to the HD 110 during read-out of a moving image data from the HD 110 is impossible because the data path between the local bus 107 and the HD controller 108 is shared. In consideration of the above configuration, in the second embodiment, the moving image processing apparatus is capable of concurrently performing input-output operations at the data path between the local bus and the HD controller and a data path between the HD controller and the bus controller. As the configuration of the moving image apparatus in the second embodiment is the same as that in the first embodiment except the moving image storage unit 105, like elements have the same reference numerals and therefore the explanations of these elements will be omitted.

Figure 5:
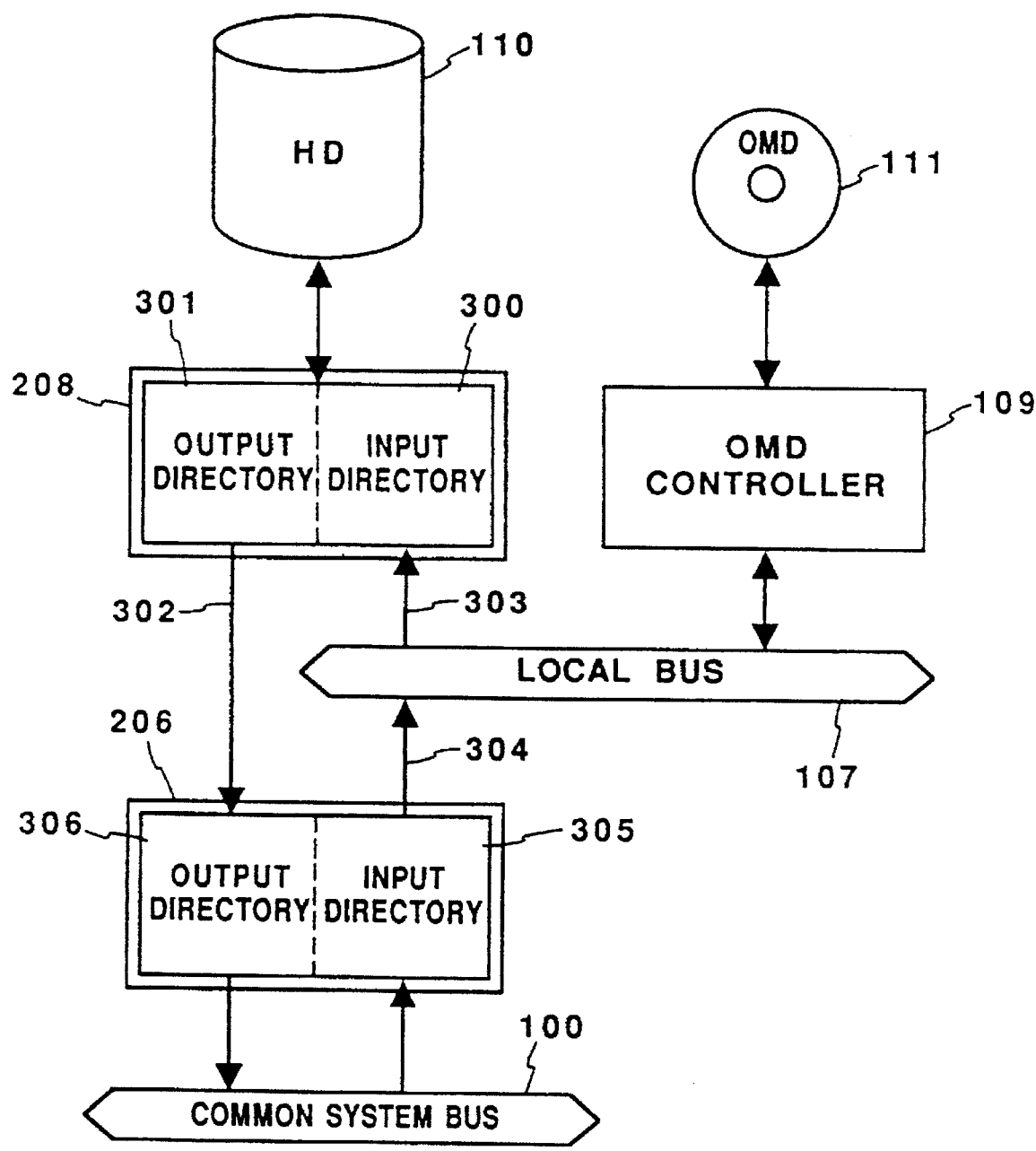
FIG. 5 is a block diagram showing the configuration of a moving image storage unit according to a second embodiment.

FIG. 5 illustrates the configuration of the storage unit 105 according to a second embodiment. In FIG. 5, the HD controller 208 includes directories 300 and 301 respectively dedicated to input and output operations of the HD 110. Similarly, a bus controller 206 includes directories 305 and 306 respectively dedicated to input and output operations of the common system bus 100. In the HD controller 208, the input directory 300 is connected to the local bus 107 through a data path 303, and the output directory 301 is connected to the output directory 306 through a data path 302. The input directory 305 in the bus controller 206 is connected to the local bus 107 through a data path 304.

When a moving image data is transferred from the OMD 111 having a slow input-output speed to the HD 110 having high input-output speed, a moving image data read out of the OMD controller 109 is sent to the input directory 300 via the local bus 107 and the data path 303 and is written into the HD 110. When the data is read out of the HD 110, the data is sent to the common system bus 100 via output directory 301 and the output directory 306.

According to this embodiment, it is possible to transfer a moving image data from the OMD 111 having a slow input-output speed to the HD 111 having a high input-output speed while other moving image data is being displayed (a moving image is being output from the HD 110), resulting in improvement of throughput of the whole apparatus. Further, the HD 110 can be used as a working area of the image memory 103 at the time of processing of a moving image data. In this case, the moving image data is written into the HD 110 via the input directory 305, the data paths 304 and 303.

[Third Embodiment (FIGS. 6 and 7)]

In the second embodiment, the moving image processing apparatus is capable of concurrent input-output operations on moving image data with an arrangement of the configuration of the bus controller, the HD controller and the multiple data paths connected to those disk controllers in the storage unit.

In this embodiment, a moving image processing apparatus having a plurality of high-speed disks for storing a large amount of moving image data and being capable of concurrent input-output operations, in addition to the configuration of the moving image storage unit 105 in the second embodiment, will be described. As the configuration of the moving image apparatus in this embodiment is the same as that in the second embodiment except the HD disk and the data paths in the moving image storage unit 105, like elements have the same reference numerals, and therefore the descriptions of these elements will be omitted.

In the second embodiment, because the moving image processing apparatus is equipped with a single HD disk, the apparatus might not be able to maintain 30 frames/sec reading speed at the time of concurrent input-output operations due to the sustained performance of the HD 100. Accordingly, the apparatus requires another device having higher input-output speed. In consideration of the above condition, in this embodiment, the moving image processing apparatus is furnished with two high-speed disks.

Figures 6, 7:
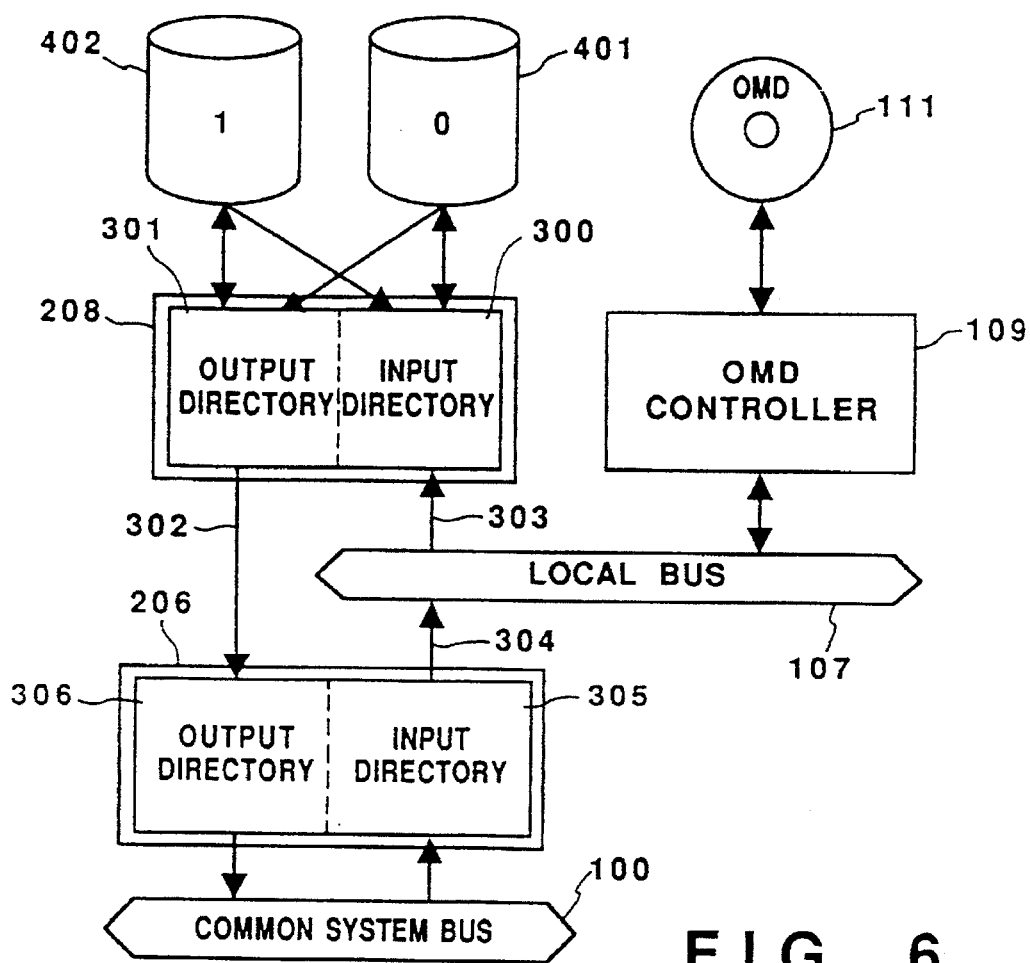
FIG. 6 is a block diagram showing the configuration of the moving image storage unit according to a third embodiment.
FIG. 7 is a diagram showing an example of a table for administration of moving image files.

FIG. 6 illustrates the configuration of the moving image storage unit 105 according to a third embodiment. The HD controller 208 changes over high-speed disks 401 and 402 simultaneously and selectively. In other words, each of the directories 300 and 301, respectively dedicated input and output operations of the HD controller 208, has data paths to both the HD's 401 and 402. The directories 300 and 301 can therefore perform a cross-call to/from both the HD's 401 and 402. For example, when a user specifies a moving image to be displayed, either of the HD's 401 and 402 to which the moving image from the OMD 111 is input is selected.

A case where the HD 401 is selected as an output destination of a moving image "A" will be described below.

As shown in FIG. 7, the CPU 1 generates an in-memory table for administration of moving image files in the working area of the RAM 3. In the administration table, the name of the moving image file in the OMD 111 designated by the user is stored in a field 51. In a field 52, the reference number of the selected HD (the HD 401 is allotted "0" and the HD 402, "1" in this embodiment) is stored. A temporary file name which the CPU 1 automatically generates for the output destination (the HD) is stored in a field 53. In a field 54, the number of the first frame in the moving image output from the OMD 111 is stored. In FIG. 7, the top row shows the moving image file name "A", the HD disk number "0", the temporary, file name "temp-A" and the first frame number "0". The next row shows numerals and characters in a case where the user specifies a moving image "B".

Next, a case where the user wishes to input a moving image "C" into either of the HD's 401 and 402 from the OMD 111 to display the moving image "C" while the moving image "A" or "B" is being displayed will be described.

According to the administration table of FIG. 7, the HD numbered "1" has been used for read-out operation to display the moving image "B". The CPU 1 therefore assigns the HD "0" to output the moving image "C" and information about the moving image "C" is set in the table.

If the user designates to change the moving image "B" being currently displayed for "A" while "C" is input into the HD "0" from the OMD 111, there will occur an access conflict to the HD "0" between write-in of the moving image "C" and read-out of the moving image "A". To avoid the access conflict, the CPU 1 changes the input of the moving image "C" into the HD "0" to the HD "1" at a frame about which no consideration about continuity of the moving image data is necessary, i.e., an intraframe which appears at fixed intervals in MPEG scheme.

This intraframe is used at fixed intervals (N) for improvement of image quality in moving image compression. When N=15, an intraframe appears at every 15th frame. If a moving image is reproduced at 30 frames/sec speed and N=15, an intraframe appears at 0.5 second intervals. Accordingly, under the control of the CPU 1, an output destination disk of the moving image "C" is changed on the condition that the frame number in the field 54 in the administration table is a multiple of 15. Thus, by changing HD's at every intraframe, one HD stores a well-arranged frame group, which enables easy controlling operation from the viewpoint of compression-expansion of moving image data.

According to the this embodiment, dynamic changeover of the plurality of high-speed disks realizes smooth transfer of a moving image data and avoids access conflict.

Though the HD's are dynamically changed in this embodiment, various modifications such as using a double buffer can be considered. Regarding the number of the HD's, it is possible to employ more than three HD's.

Further, the resolution of moving image which can be processed is not limited to that in the HDTV system, but it goes without saying that moving images with resolution of any system other than the HDTV system can also be processed. Other storage media and high-speed disk interfaces than the OMD and the IPI (intelligent peripheral interface) employed in this embodiment can be applied to the moving image apparatus of this embodiment.

[Fourth Embodiment (FIGS. 8–11)]

FIG. 8 illustrates the construction of a moving image processing apparatus according to a fourth embodiment. In this embodiment, the whole configuration except the moving image storage unit 105 is correspondent to that in the first embodiment and explanations about like elements having the same reference numerals will be omitted. In FIG. 8, disk controllers 123 and 124 are respectively for controlling moving image disks 122 and 125. The moving image disk 125 stores moving image data. The moving image disk 122 stores additional information corresponding to the moving image data. Instructions such as change of moving image reproduction speed are designated with keyboard (KB) 5 and the mouse 6.

Figure 9:
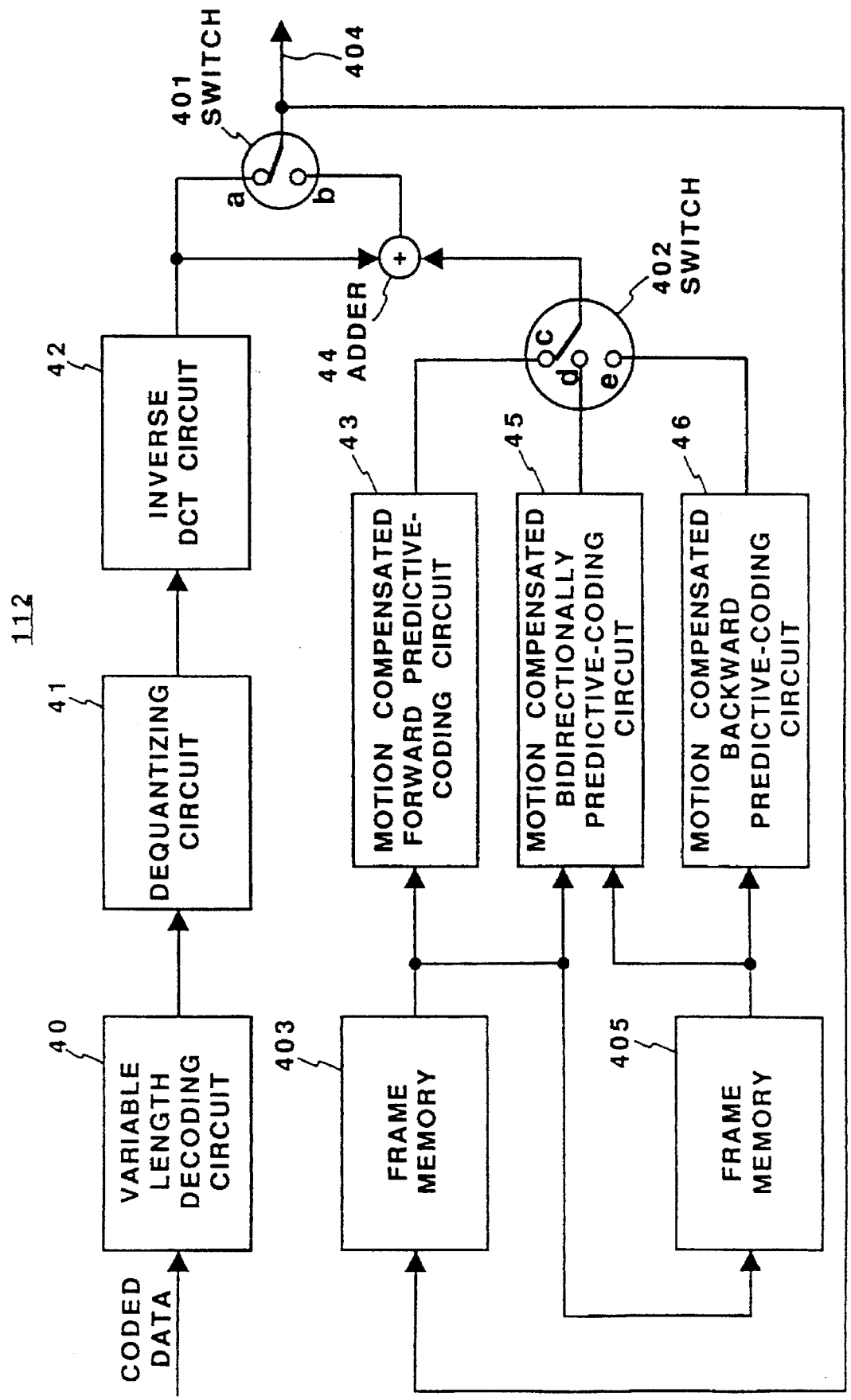
FIG. 9 is a block diagram showing the construction of an expander.

FIG. 9 illustrates the construction of the expander 112 for expanding data compressed and coded in accordance with the MPEG scheme. In FIG. 9, input data is an image frame including compressed coded data. First, an intraframe is input and a switch 401 is set to a position a. The intraframe is expanded via a variable length decoding circuit 40, a dequantizing circuit 41 and an inverse DCT circuit 42 and output by output 404 into the VFM 101. At the same time, the expanded data is stored in a frame memory 403.

Next, a predicted frame or an interpolated frame is input and the switch 401 is set to a position b. An adder 44 adds the expanded image data based on a differential image sent from the disk 125 to the motion compensated predictive image data based on the expanded image data stored in the frame memory 403 and/or 404 and the output 404 outputs the predictive frame into the VFM 101. At the same time, the expanded image data of the predictive frame is stored into the frame memory 403. The expanded image data of the predicted frame in the frame memory 403 is input into a motion compensated forward predictive-coding circuit 43 which generates a predicted image, when a switch 402 is set to a position c. At this time, image data initially stored in the frame memory 403 is transferred to a frame memory 405.

In expansion of interpolated frame, in accordance with the predictive direction (forward, backward, or bidirectional), the switch 402 is set to one of the positions c, d and e, and any of the motion compensated forward predictive-coding circuit 43, a motion compensated bidirectionally predictive-coding circuit 45 or a motion compensated backward predictive-coding circuit 46, and generates a predicted image.

Figure 10:
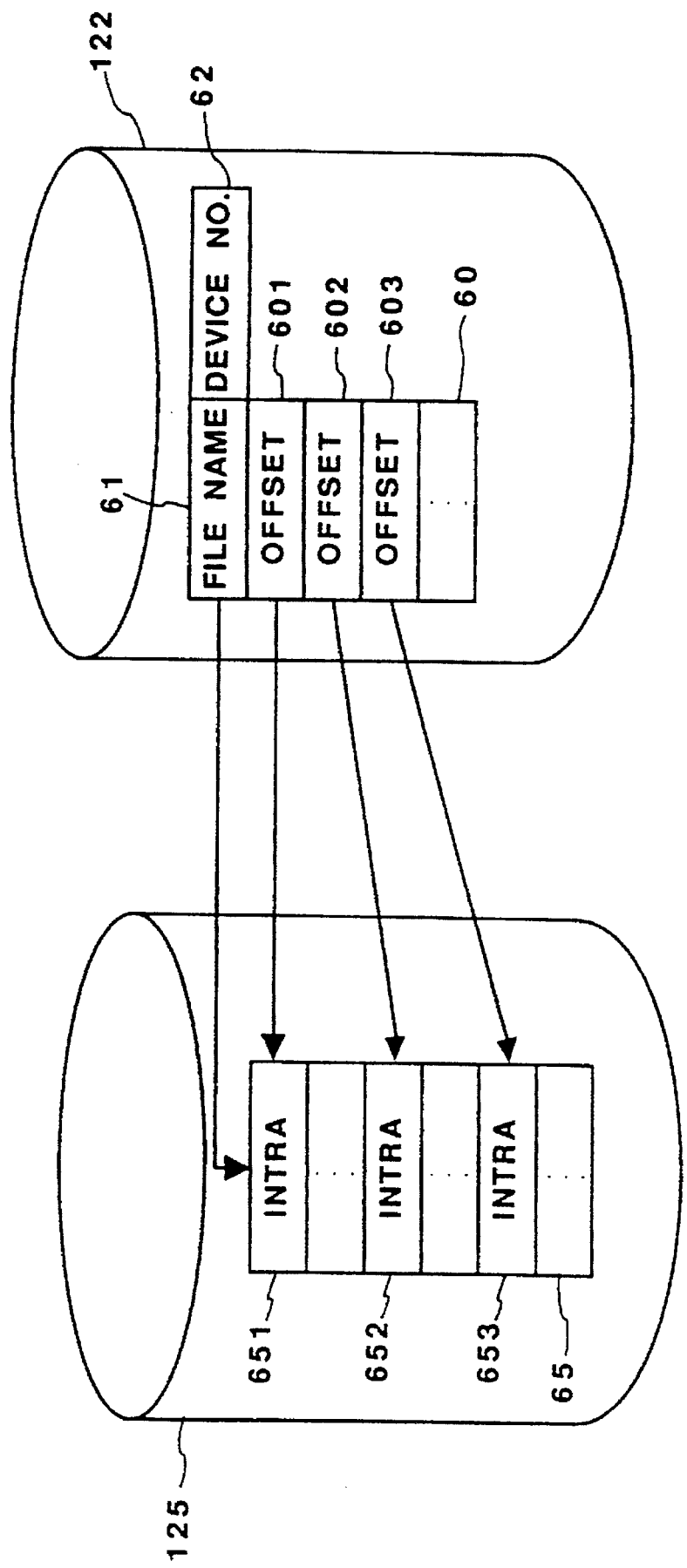
FIG. 10 shows the relation between moving image data files and corresponding administrative information files.

Next, a method for administrating additional information of a moving image data, administrative information and moving image files will be described with reference to FIG. 10. FIG. 10 illustrates the relation between moving image data files and the corresponding administrative information files. In FIG. 10, the moving image data disk 125 stores moving image data 65 coded in the MPEG scheme. This coded data includes intraframes 651–653 generated at fixed intervals (N=15, i.e., every 15th frame in this embodiment).

On the other hand, the moving image administrative disk 122 stores administrative information 60 corresponding to the moving image data 65. As shown in FIG. 10, the disk 122 has a file name field 61, a device number field 62 which includes the reference number of the device storing the moving image data and offset fields 601–603, which indicate respective heads of the intraframes. The number of the offset fields corresponds to the number of the intraframes. In FIG. 10, the offset fields 601–603 respectively correspond to the intraframes 651–653. Each of the offset fields stores information for direct access to a corresponding intraframe, such as a bit number from the head of a data file.

The CPU 1 automatically generates a file name of the moving image data in the disk 125 and uses a moving image file name designated by the user as the name of the administrative information 60 in the disk 122, thus controls the two disks. More specifically, the CPU 1 logically treats a moving image data with its administrative information and additional information as one file, even though they are separately stored in plural storage media. To the user's eye, a moving image data, its administrative information and additional information look as a single file having a file name by the user. Actually the file the user looks at is a logical file (a logical combination of a moving image data and its administrative information and additional information) having the same file name as that of the moving image data.

Further, the bit number of an intraframe from the head of a moving image data can be easily obtained in a moving picture encoder (not shown) as additional information for coding of and moving image data.

Next, moving image data reproduction processing carried out by the moving image processing apparatus having the above construction will be described with reference to the flowchart of FIGS. 11A, 11B. In this embodiment, as explained with FIG. 10, a moving image data and its administrative information and additional information are stored in a continuous area in the disk 122 as a single file.

At step S110, a moving image reproduction is instructed with the keyboard 5 or the mouse 6. Processing proceeds to step S120, at which whether the current processing mode is a normal playback mode or fast playback mode is examined. If it is the normal playback mode, the processing proceeds to step S130. If it is the fast playback mode, the processing proceeds to step S160.

At step S130, whether the normal playback mode is for forward playback or reverse playback is examined. If it is for forward playback, the processing proceeds to step S132, and if it is for reverse playback, the processing proceeds to step S142. In the case of forward playback, an address of the first frame of a moving image data stored in the disk 125 is set at step S132. At step S134, a data frame corresponding to the address set at step S132 is read out, then at step S136, the image data is transferred to the expander 112. At step S138, an address of the next frame is set. If it is determined at step S140 that the reproduction is carried on, the processing returns to step S134 and the reproduction continues. If it is determined at step S140 that the reproduction is stopped, the processing is terminated.

In case of reverse playback, an address of the last frame of the moving image data stored in the disk 125 is set at step S142. At step S144, a data frame corresponding to the address set at step S142 is read out, then at step S146, the image data is transferred to the expander 112. At step S148, an address of the preceding frame is set. If it is determined at step S150 that the reproduction is carried on, the processing returns to step S144 and the reverse playback continues. If it is determined at step S150 that the reproduction is stopped, the processing is terminated.

On the other hand, if it is determined at step S120 that the current mode is the fast playback mode, whether the fast playback mode is for forward playback or for reverse playback is examined at step S160. If it is for forward playback, the processing proceeds to step S162, and if it is for reverse playback, the processing proceeds to step S170. In case and of forward playback, offset information of an intraframe is read out from image administrative information stored in the disk 122 at step S162. At step S164, image data of an intraframe whose address corresponds to the offset information is read out, and at step S166, the image data is transferred to the expander 112. If it is determined at step S168 that the reproduction is carried on, the processing returns to step S162 and offset information of the next intraframe is read out, thus the reproduction continues. If it is determined at step S168 that the reproduction is stopped, the processing is terminated. In this embodiment, as intraframes exist every 15th frame, read-out of a moving image data file jumps 15 frames from one intraframe to the next. Consequently, the fast playback is 15 times faster than the normal playback.

In case of reverse playback, at step S170, offset information of the last intraframe is read out from image administrative information stored in the disk 122. At step S172, an image data of an intraframe whose address corresponds to the offset information is read out, and at step S174, the image data is transferred to the expander 112. If it is determined at step S176 that the reproduction is carried on, the processing returns to step S170 at which offset information of the preceding intraframe is read out, and the processing continues. If it is determined at step S176 that the reproduction is stopped, the processing is terminated.

According to this embodiment, in fast playback, read-out of a moving image data and read-out of moving image administrative information are performed separately through different disks and different disk controllers, which resolves the possible access conflict. Thus, this results in efficiently reproducing moving image data As the user can treat moving image data and its administrative information as a logical single file, correspondence between moving image data and moving image administrative information can always be kept, avoiding erroneous deletion of either of them. Further, the devices can be selected in accordance with characteristics of data, since the disk for storing a moving image data has large capacity and a high input-output speed, while the disk for storing additional information has a comparatively small capacity and a lower input-output speed. Thus an appropriate and low-cost system can be arranged.

In this embodiment, moving image data is stored in one file, but it may instead be stored in a plurality of files or a plurality of disks.

Though moving image administrative information is stored in disk different from a disk where corresponding moving image data is stored and is read out of the disk in every reproduction, it can be loaded on the working area of the RAM 3 and managed on the memory. Further, by storing administrative information other than information as described above (e.g., timing information for scene-change), display of only an image frame at which a scene-change occurs can be realized. In the case of fast playback, if offset values of predicted frames between intraframes as well as offset values of intraframes are stored in offset fields, a fast playback (or a fast reverse playback) based on predicted frames can be realized. If a predicted frame appears at every, third frame as shown in FIG. 2, a playback 3 times faster than a normal playback can be considered.

[Fifth Embodiment (FIG. 12)]

Figure 12:
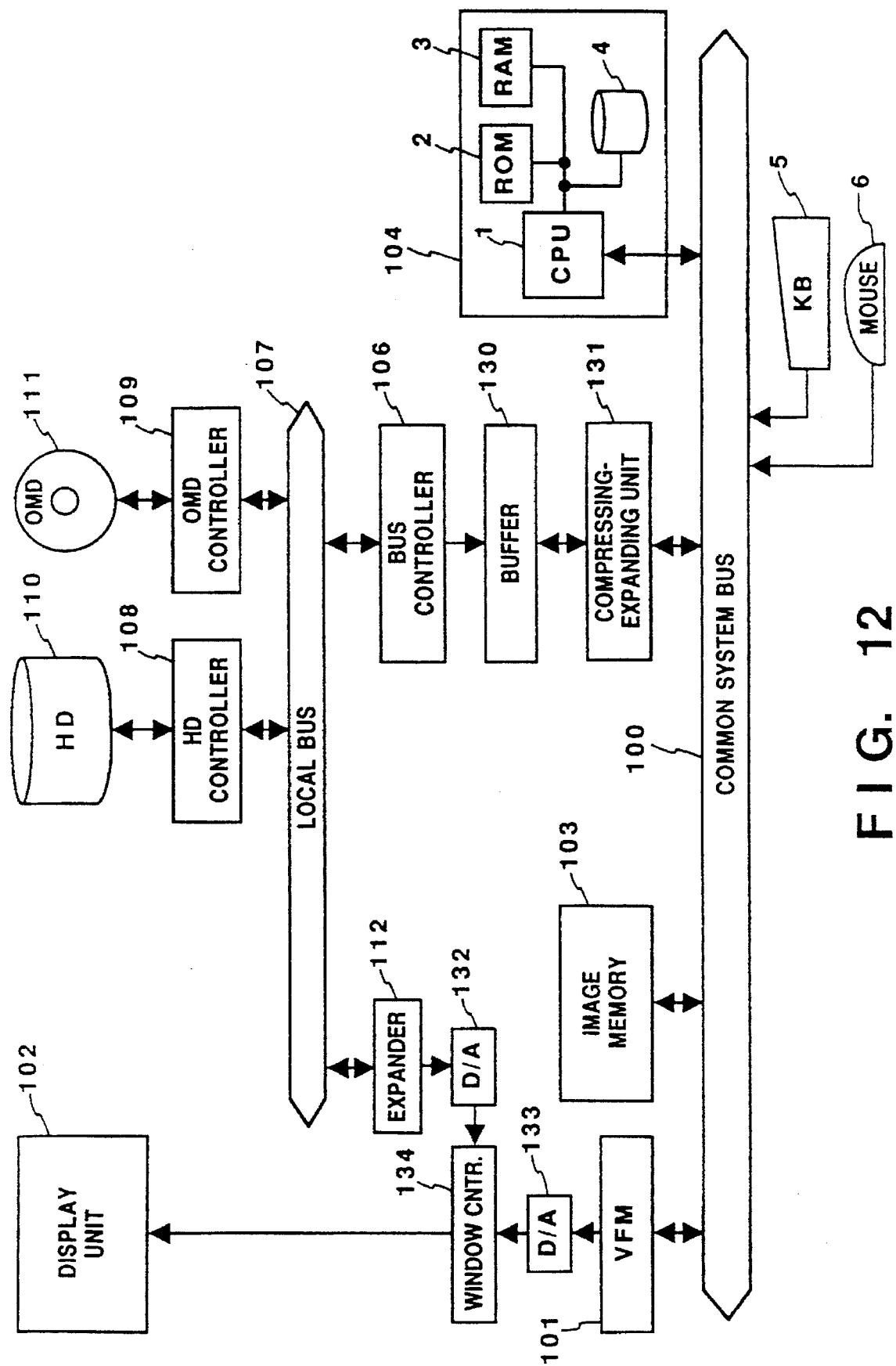
FIG. 12 is a block diagram showing the construction of the moving image processing apparatus according to a fifth embodiment.

FIG. 12 is a block diagram which illustrates the configuration of a moving image processing apparatus according to a fifth embodiment. Also in this embodiment, explanations of like elements having the same reference numerals as those in the first embodiment will be omitted. The only difference between the apparatus of the first embodiment and that of the fifth embodiment is that the local bus 107, which is connected to the HD controller 108 and the OMD controller 109 in the first embodiment, is directly connected to the expander 112 in this embodiment.

In FIG. 12, the numeral 130 denotes a moving image data buffer; 131, a compressing-expanding unit for moving image data; 132 and 133, D/A converters; and 134, a window controller for controlling the display unit 102.

In the above-configured apparatus, the CPU 1 generates data to be displayed and supplies to the VFM 101 through the common system bus 100, and after D/A conversion, the display unit 102 displays the data, while the CPU 1 controls output moving image data stored in the HD disk 110 or the OMD 111 to the expander 112 through the local bus 107 and the expander 112 expands the data.

The common system bus 100 is connected to the local bus 197 with the bus controller 106, the buffer 130 and the compressing-expanding unit 131. With this data path, the CPU 1 reads out moving image data stored in the OMD 111 through the buffer 130 and the compressing-expanding unit 131 expands the data in accordance with the transfer performance of the common system bus 100. The image memory 103 stores the expanded data and the CPU 1 carries out further image processing. Conversely through the above data path, the compressing-expanding unit 131 compresses the moving image data from the image memory unit 103 through the buffer 130 and the bus controller 106 and the OMD 111 stores the compressed data.

According to this embodiment, the supply path to the display unit 102 for image data formed in the CPU 1 and that for moving image data are independent of each other, which resolves a conceivable bus conflict two bodies of data. The display 112 can therefore display involving the moving image data at an extremely fast transmission speed without being influenced by other data. Further, it is possible that the CPU unit 104 processes moving image data stored in the OMD 111 and the display 112 displays the processed data.

In the above configuration, the data transmission performance of the local bus 107 can be determined based upon that for moving image data, while the data transmission performance of the common system bus 100 can be determined based upon that for data to be displayed formed in the CPU unit 104, as a result of which, two data buse (a common system bus 100 and a local bus 107) having lower performance than that of the common system bus 100 in the first embodiment can be employed.

In the above five embodiments, the moving image compression method is based on the MPEG scheme however, it is not limited to the above method. It goes without saying that other compression methods can be applied to the present invention. The present invention is applicable to a system constituted by a plurality of devices, or to an apparatus comprising a single device. Furthermore, it goes without saying that the invention is applicable also to a case where the object of the invention is attained by supplying a program to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. A moving image processing method for expanding compressed moving image data and displaying the expanded data, comprising the steps of:

a first transfer step of transferring the compressed moving image data stored in a first storage medium having a large capacity and a relatively slow access speed to a second storage medium having a small capacity and a fast access speed;

a second transfer step for reading the compressed moving image data out of the second storage medium and transferring the compressed moving image data to an image expanding unit adjusting the transfer speed to a predetermined display speed of the moving image; and a display step for displaying the moving image data expanded by the image expansion unit, wherein the transfer path for the compressed moving image data in said second transfer step is only for the compressed moving image data.

* * * * *

UNITED STATES PATENT AND TRADEMARK OFFICE
CERTIFICATE OF CORRECTION

PATENT NO. : 5,646,685
DATED : July 8, 1997
INVENTOR(S) : MIYUKI ENOKIDA, ET AL.

It is certified that error appears in the above-identified patent and that said Letters Patent is hereby corrected as shown below:

On the title page, item

REFERENCES CITED
    [56]
        "4,735,349    4/1988    Keith .........348/390"
should be deleted.

COLUMN 1
    Line 42, "a" should be deleted.
    Line 52, "(forward" should read --forward--, and "playback)." should read --playback.--.
    Line 55, "a" should be deleted.
    Line 56, "another" should read --other--.
    Line 66, "can not" should read --cannot--.

COLUMN 2
    Line 4, "a" should read --the--.
    Line 5, "MPEG," should read --the MPEG,--, and "a" should be deleted.
    Line 11, "20" should be deleted.
    Line 30, "can not" should read --cannot--.
    Line 57, "second" should read --a second--.

UNITED STATES PATENT AND TRADEMARK OFFICE
CERTIFICATE OF CORRECTION

PATENT NO. : 5,646,685  
DATED : July 8, 1997  
INVENTOR(S) : MIYUKI ENOKIDA, ET AL.

Page 2 of 6

It is certified that error appears in the above-identified patent and that said Letters Patent is hereby corrected as shown below:

COLUMN 3

Line 26, "fast" should read --fast, and--.
    Line 38, "data" should read --data,--.
    Line 40, "data a" should read --data, a--.

COLUMN 4

Line 12, "cost worthy" should read --cost-worthy--.
    Line 28, "FIG. 3" should read (Start a new paragraph) --FIG. 3--.
    Line 63, "below" should read --below,--.
    Line 65, "ISO" should read --of the ISO--, and "MPEG scheme)" should read --"the MPEG scheme)--.

COLUMN 5

Line 10, "MPEG" should read --the MPEG--.
    Line 38, "an" should be deleted.
    Line 39, "an" should be deleted.

UNITED STATES PATENT AND TRADEMARK OFFICE
CERTIFICATE OF CORRECTION

PATENT NO. : 5,646,685  
DATED : July 8, 1997  
INVENTOR(S) : MIYUKI ENOKIDA, ET AL.

Page 3 of 6

It is certified that error appears in the above-identified patent and that said Letters Patent is hereby corrected as shown below:

Line 40, "MPEG scheme" should read --the MPEG scheme,--.

Line 56, "fication" should read --fications--.

Line 65, "coded" should read --the coded--.

COLUMN 6

Line 1, "and" should be deleted.

Line 39, "instruction" should read --instruction to--.

Line 45, "system-bus" should read --system bus--.

Line 53, "Thus" should read --Thus, the--.

Line 64, "OMD 111" should read -- OMD 111,--.

COLUMN 7

Line 24, "embodiment thus" should read --embodiment, thus,--.

Line 44, "numerals" should read --numerals,--.

Line 60, "high" should read --a high--, and "a" should be deleted.

UNITED STATES PATENT AND TRADEMARK OFFICE
CERTIFICATE OF CORRECTION

| | | |
|---|---|---|
| PATENT NO. : | 5,646,685 | Page 4 of 6 |
| DATED : | July 8, 1997 | |
| INVENTOR(S) : | MIYUKI ENOKIDA, ET AL. | |

It is certified that error appears in the above-identified patent and that said Letters Patent is hereby corrected as shown below:

COLUMN 8

Line 7, "305, the" should read --305, and the--.

Line 39, "dedicated" should read --dedicated to--.

Line 60, "temporary," should read --temporary--.

COLUMN 9

Line 14, "MPEG" should read --the MPEG--.

COLUMN 10

Line 34, "data" should read --data,--.

Line 58, "and" should be deleted.

Figure 11B:
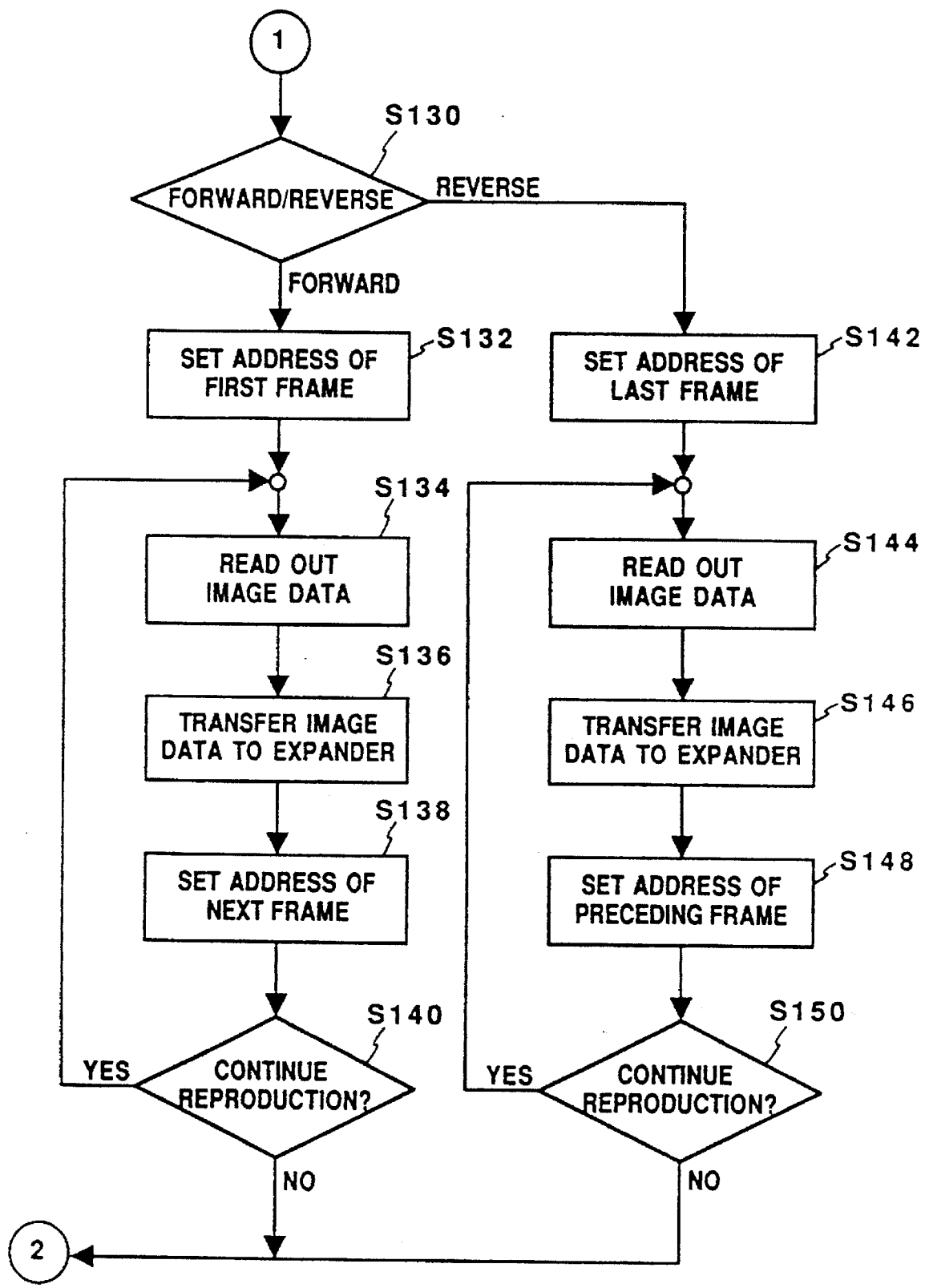

Line 62, "FIGS. 11A, 11B." should read --FIGS. 11A and 11B.--.

COLUMN 11

Line 36, "case and" should read --the case--.

Line 51, "case" should read --the case--.

UNITED STATES PATENT AND TRADEMARK OFFICE
CERTIFICATE OF CORRECTION

PATENT NO. : 5,646,685 Page 5 of 6
DATED : July 8, 1997
INVENTOR(S) : MIYUKI ENOKIDA, ET AL.

It is certified that error appears in the above-identified patent and that said Letters Patent is hereby corrected as shown below:

COLUMN 12

Line 6, "a" should be deleted.
Line 7, "large" should read --a large--.
Line 26, "every," should read --every--.
Line 45, "supplies" should read --supplied--.
Line 48, "output" should read --output of--.
Line 49, "bus 107" should read --bus 107,--.
Line 52, "197" should read --107--.
Line 55, "buffer 130" should read --buffer 130,--.
Line 58, "data" should read --data,--.
Line 62, "controller 106" should read --controller 106,--.
Line 67, "conflict" should read --conflict involving the--.

COLUMN 13

Line 1, "involving" should be deleted.
Line 11, "buse" should read --buses--.

UNITED STATES PATENT AND TRADEMARK OFFICE
CERTIFICATE OF CORRECTION

PATENT NO. :  5,646,685
DATED      :  July 8, 1997
INVENTOR(S):  MIYUKI ENOKIDA, ET AL.

It is certified that error appears in the above-identified patent and that said Letters Patent is hereby corrected as shown below:

Line 16, "scheme" should read --scheme,--.
Line 19, "The" should read
   (Start new paragraph) --The--.

Signed and Sealed this

Third Day of March, 1998

Attest:

BRUCE LEHMAN

Attesting Officer    Commissioner of Patents and Trademarks